United States Patent [19]

Kirkendall

[11] Patent Number: 4,796,909
[45] Date of Patent: Jan. 10, 1989

[54] LOW-BED SERVICE CART

[76] Inventor: Vern S. Kirkendall, 783 Portal Dr., Chico, Calif. 95926

[21] Appl. No.: 153,845

[22] Filed: Feb. 8, 1988

[51] Int. Cl.⁴ .............................................. B62B 3/02
[52] U.S. Cl. .................................... 280/651; 280/659; 280/47.37 R; 280/87.01; 180/906; 296/26
[58] Field of Search .................... 280/47.34, 47.37 R, 280/87.01, 638, 651, 656, 659, 47.26, 79.2, 654; 180/905, 906; 224/42.42 R, 273; 190/110; 296/26

[56] References Cited

U.S. PATENT DOCUMENTS

| | | | |
|---|---|---|---|
| 1,582,045 | 4/1926 | Don Howe | 280/87.01 X |
| 2,718,404 | 9/1955 | Burskey | 280/659 |
| 3,035,847 | 5/1962 | Born | 280/654 |
| 3,104,890 | 9/1963 | Hill | 280/659 |
| 3,116,935 | 1/1964 | Mitchin et al. | 280/87.01 |
| 3,591,194 | 11/1968 | Vega | 280/47.26 |
| 3,677,571 | 7/1972 | Maturo, Jr. et al. | 280/47.3 X |
| 3,729,038 | 4/1973 | Ekeson | 190/110 X |
| 3,826,511 | 7/1974 | Frank | 280/47.31 X |
| 3,861,695 | 1/1975 | Shourek et al. | 280/5.24 |
| 4,114,914 | 9/1978 | Cohen | 280/651 X |
| 4,166,638 | 9/1979 | De prado | 280/638 |
| 4,268,049 | 5/1981 | Salvador | 280/659 X |
| 4,316,615 | 2/1982 | Willette | 280/47.26 |
| 4,451,053 | 5/1984 | Alioa et al. | 280/47.37 R X |
| 4,523,774 | 6/1985 | Dickerson | 280/655 |

FOREIGN PATENT DOCUMENTS

| | | | |
|---|---|---|---|
| 1084747 | 1/1955 | France | 280/656 |
| 65009 | 1/1950 | Netherlands | 280/638 |
| 223802 | 10/1924 | United Kingdom | 280/656 |

Primary Examiner—David M. Mitchell
Assistant Examiner—Brian L. Johnson

[57] ABSTRACT

This invention provides a light weight, four wheeled pull-type service cart designed to transport heavy loads over sandy terrain. The bed of the cart is adjustable to accommodate different sized cargo ranging from large ice chests to small individual items or firewood. An accessory fabric storage pouch is available which can be attached to the transported cargo and is especially designed to carry folding chairs along with other beach items.

8 Claims, 2 Drawing Sheets

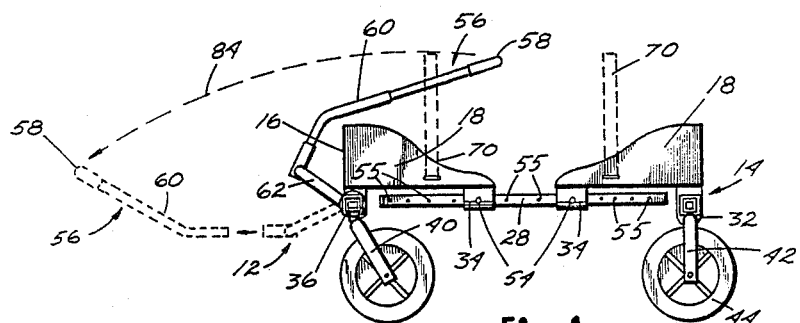
Fig. 4
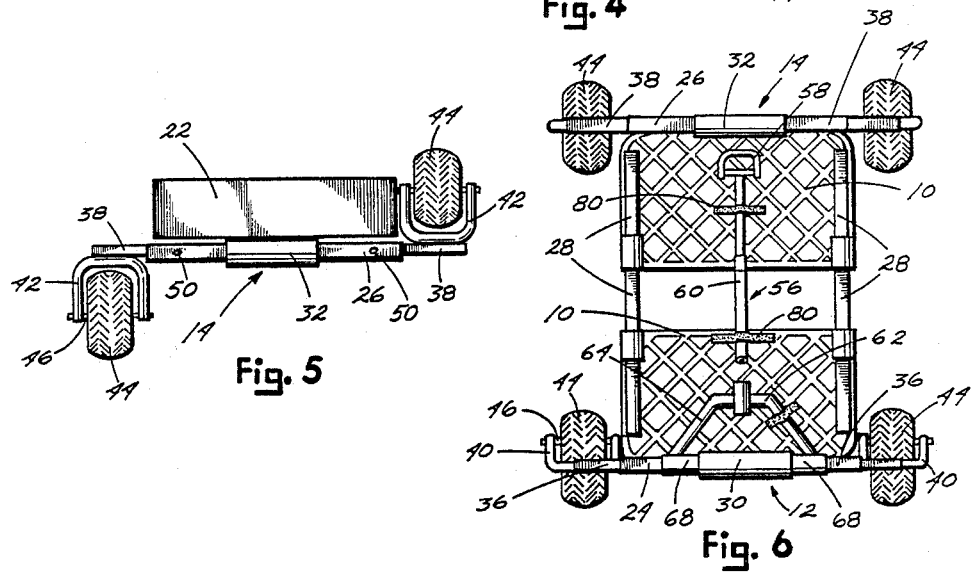
Fig. 5
Fig. 6
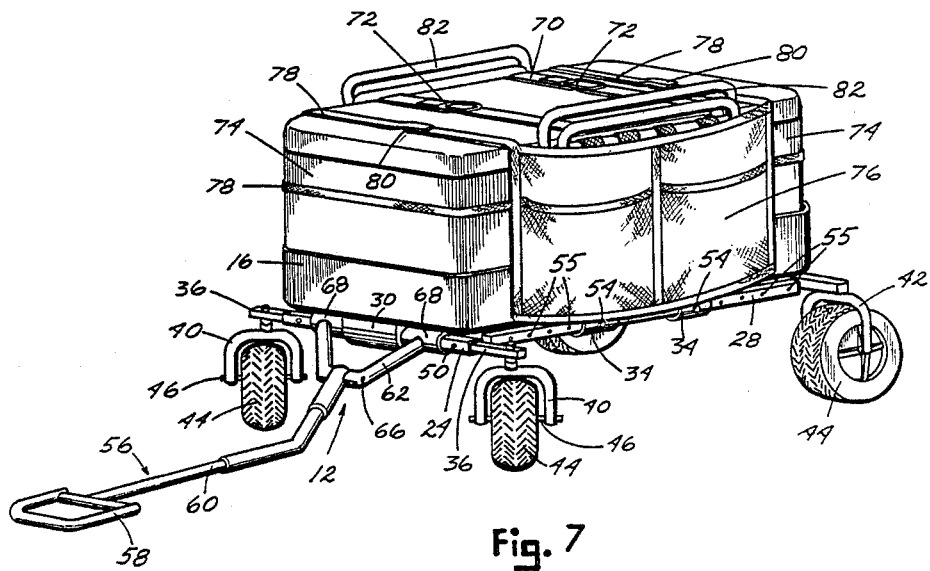
Fig. 7

LOW-BED SERVICE CART

BACKGROUND OF THE INVENTION

1. Field of the Invention

This invention relates to manually powered service vehicles. It is particularly directed towards a pull-type vehicle designed for ease in transporting large, heavy containers, such as ice chests, to areas inaccessible by motor vehicles.

2. Description of the Prior Art

Issued patents considered in the development of past art pertaining to the present invention were examined in the following classes and subclasses; 280/654, 653, 659, 47, 26, 24, 47.13B, 46.7R.

Those considered most pertinent to my invention included the following:

A patent issued to Burskey, dated Oct. 8, 1954, U.S. Pat. No. 2,718,404, illustrates an expansive three wheel cart.

Born was issued U.S. Pat. No. 3,035,847, dated July 31, 1959, for a two wheeled cart.

U.S. Pat. No. 3,104,890, issued to Hill, dated Sept. 24, 1963, shows a low swung, four wheeled cart with expansive frame.

On July 6, 1971, Vega was issued patent number 3,591,194, on a two wheeled ice chest cart.

Maturo was issued U.S. Pat. No. 3,677,571, on July 18, 1972, for a collapsible beach cart with one roller wheel.

U.S. Pat. No. 3,826,511 was issued to Frank on July 30, 1974, for "Collapsible Beach Tote Barrow with Ball Combination".

On Jan. 21, 1975, Shourek et al, was issued U.S. Pat. No. 3,861,695, for a luggage carrying device.

A patent issued to Willette, on Feb. 23, 1982, U.S. Pat. No. 4,316,615 illustrates a two wheeled beach cart.

Alioa et al, was issued U.S. Pat. No. 4,451,053, on May 29, 1984 for a two wheeled hand cart.

U.S. Pat. No. 4,523,774, dated June 18, 1985, was issued to Dickerson, and illustrates a collapsible tow cart utilizing two balls for wheels.

Several types of patented carts were produced in the past art patent search, none, however, were found to contain all the features present in my invention. Several devices had no means for securing the load to the cart and none claimed a removable, accessory storage compartment.

Some of the patented devices seen, including those shown in U.S. Pat. Nos. 3,035,847, 3,591,194, 3,677,571, 3,826,511, and 4,316,615, were not adjustable for various sizes of loads nor were some of them suitable for use with conventional ice chests, specifically the devices of U.S. Pat. Nos. 3,591,194, and 3,677,571. Although carriers illustrated in U.S. Pat. Nos. 3,104,890, 4,451,053 and 4,523,774 are capable of carrying one large ice chest, it appears problems would arise if the user tried to carry several small chests or other items, as the base or flooring of these patented devices generally consists of a few cross bars which do not provide uniform support. Several of the disclosed devices provide wheels which would be completely unsuitable for use on sandy beaches, either due to their small size or narrow design, such as the devices of U.S. Pat. Nos. 2,718,404, 3,104,890, and 3,816,695. Many of the carts shown had one or two wheels, such as the carriers of U.S. Pat. Nos. 3,035,847, 3,591,194, 3,677,571, 3,826,511, 3,861,695, 4,316,615, 4,451,053, and 4,523,774, which require the bed of the cart to be tilted in order to be transported and therefore, a portion of the weight of the balance and support part of the weight of the cargo and cart. The necessary titling tends to imbalance the cart making maneuvering difficult and requiring a securing means for the cargo. Also, there are times when tilting the cargo is not desirable, especially if the cargo consists of many small individual items which could become dislodged. Still other devices seen are well adapted for transporting ice chests but were not adaptable for hauling small, individual articles, such as firewood. Included in these devices were those of U.S. Pat. Nos. 3,104,890, 4,451,053, and 4,523,774.

Very few of the past art patents claimed devices having foldable handles and wheels which is very important for storing or transporting one of the carts.

My device overcomes these disadvantages by providing adjustability in the frame and handle structure and with folding wheel sets fitted with wheels adapted for sand and rough ground usage. I therefore feel my invention comprises a unique and useful design in multi-use manual powered service vehicles.

SUMMARY OF THE INVENTION

In practicing my invention, I have developed a rectangular service cart having a telescoping frame with a two piece adjustable bed, four adjustable and removable balloon tire wheels, and a removal handle. The bed of the cart, although perforated, provides support for a multiple of small articles.

A principal object of my invention is to provide a service cart for use in transporting heavy items, such as a large ice chest, over sandy terrain, and in areas inaccessible to motor vehicles with the cart having four balloon tire wheels designed for easy passage through sandy areas and over rough ground.

A further object of my invention is to provide a service cart which is easily maneuvered even with heavy loads and does not require any portion of the load to be balanced or supported.

Another object of my invention is to provide a service cart which is adjustable in length to accommodate various sized of different loads.

A further object of my invention is to provide a service cart having a bed with a wide area of support capable of carrying a load of comparatively small objects.

A still further object of my invention is to provide a service cart which is adjustable in height for easier storage by relocation of the wheels and handle.

An even further object of my invention is to provide a service cart designed to be pulled, which requires less exertion and is more manueverable than pushing.

An even further object of my invention is to provide a service cart with accessory securing means, provided in the form of removable straps.

A still further object of my invention is to provide a service cart with accessory storage compartments, provided in the form of dual fabric pouches.

Other objects and advantages of my invention will be better understood with reference to the following specification, illustrations, and appended claims.

BRIEF DESCRIPTION OF THE DRAWINGS

In the drawings

FIG. 4 is a left side view of the preferred embodiment, showing the placement of attachment straps and the adjustability of the handle.

FIG. 5 is a rear view of the invention showing the storage position of the right rear wheel.

FIG. 6 is a bottom view of the invention illustrating the storage position of the handle.

FIG. 7 is a perspective in use view of the preferred embodiment containing an ice chest and illustrating the dual fabric storage accessory.

DRAWING REFERENCE NUMBERS

- 10—expanded material bed
- 12—front rail assembly
- 14—back rail assembly
- 16—front panel
- 18—side panel
- 20—strap guides
- 22—back panel
- 24—front wheel support bar
- 26—rear wheel support bar
- 28—adjustable bed support bar
- 30—front bed support hanger
- 32—rear bed support hanger
- 34—side bed support hanger
- 36—front wheel swivel insert rod
- 38—back wheel support insert rod
- 40—front wheel swivel bracket
- 42—rear wheel stationary brackets
- 44—balloon tire wheel
- 46—wheel axle
- 48—wheel retainer clip
- 50—Valco snap button
- 52—Valco button adjustment apertures
- 54—retainer pin
- 55—retainer pin apertures
- 56—handle
- 58—hand grip
- 60—telescoping handle arm
- 62—left split tongue
- 64—right split tongue
- 66—bolt
- 68—split tongue slide connector
- 70—straps
- 72—lap buckle
- 74—ice chest
- 76—accessory storage pack
- 78—attachment straps
- 80—Velcro
- 82—folding chairs
- 84—directional arrows

DESCRIPTION OF THE PREFERRED EMBODIMENT

Figure 3:
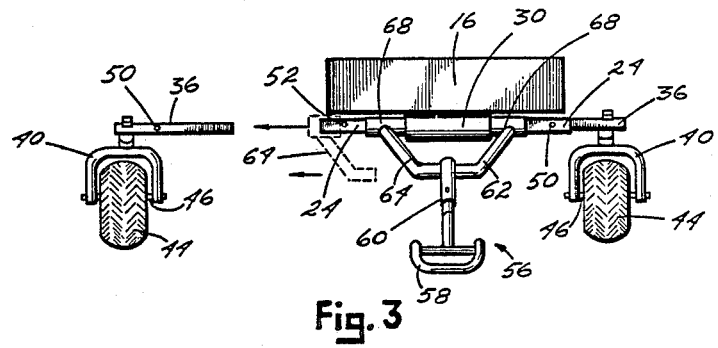
FIG. 3 is a front view of the invention showing detachment of the right front wheel and handle apparatus.

Referring now to the drawings where the preferred embodiment of the invention is illustrated. The load carrying portion or bed of the invention, shown in FIG. 1, consists of two halves of rectangular expanded material bed 10. This bed is designed with an open floor configuration which reduces the weight of the device and reduces the amount of material needed to manufacture the part. This configuration also allows for easy drainage of water and sand. Expanded material bed 10 has upwardly extending peripheral sides which consist of front panel 16, four sections of side panel 18 and back panel 22 all of which help to retain the transported cargo. Expanded material bed 10 is supported by front rail assembly 12, and back rail assembly 14, which comprise the wheel and axle systems, having permanent stationary attachment made by front bed support hanger 30 and rear bed support hanger 32. Support hangers are squared on the top surface for attachment to expanded material bed 10, but the bottom portion is rounded and contains a tubular passageway. Front bed support hanger 30 is designed to support and permanently retain, within the tubular passageway, the front wheel supporting structure of front wheel support rod 24, which is a rectangular tubular structure. Front wheel support rod 24 removably retains rectangular front wheel swivel insert rod 36 to which is attached, on each end, front wheel swivel bracket 40. Each of the two front wheel swivel insert rods 36 are retained, within front wheel support rod 24 by one Valco snap button 50 having the button knob through one Valco button adjustment aperture 52. Valco snap buttons are commercially available springs with a tubular button on one end. They are supplied in various sizes for positioning telescoping tubing with the button through apertures in the tubing. By depressing the button knob on Valco adjustment clip 50 front wheel swivel insert rod 36 can be completely removed, inverted and reinserted for the storage position. This reduces the over all height of the cart assemblage, as seen in FIG. 3 and 5.

Front wheel swivel bracket 40 is a tubular U-shaped frame which holds one balloon tire wheel 44 retained therein by wheel axle 46, which is itself removably retained by wheel retainer clip 48.

Back rail assembly 14 is attached to the rear of expanded material bed 10 in much the same manner as the front section, being permanently attached to rear bed support hanger 32, which permanently retains rear wheel support bar 26. Rear wheel support bar 26 removably retains back wheel support insert rod 38 to which is permanently attached, to either end, rear wheel stationary bracket 42. Both back wheel support rods 38 are also retained within rear wheel support bar 26 with one Valco snap button 50 its button knob through one Valco button adjustment aperture 52. Rear wheel stationary bracket 42 is another tubular U-shaped bracket which holds one balloon tire wheel 44, retained by wheel axle 46, a wheel retainer clip and, Valco adjustment clip 50. Both rear wheels can be removed by pressing in Valco snap button 50 and pulling out back wheel support insert rods 38.

The two sides of expanded material bed 10 are permanently attached, two to each side, with side bed support hanger 34. Two side bed support hangers 34 are attached to the sides of the front half of expanded material bed 10 and two are attached to the back half of expanded material bed 10, making a total of four side bed support hangers 34. On each side of the service cart, two of side bed support hangers 34 movably retain one adjustable bed support bar 28. The length of expanded material bed 10 can be adjusted by moving side bed support hangers 34 along adjustable bed support bar 28. Means for stabilizing adjustable bed support bar 28 to the two side bed support hangers 34 are provided with retainer pin 54 and a multiple of retainer pin apertures 55 located through adjustable bed support bar 28 and one through each side bed support hanger 34. Retainer pin 54 contains a ball bearing unit located on the outer edge of the distal end which retains it in place during use, but also has the capability to recess slightly within retainer pin 54 in order to allow insertion through retainer pin apertures 55.

A pulling means is provided in the form of handle 56 comprised of cylindrical tubes forming handle grip 58 which is permanently attached to telescoping handle arm 60. Telescoping handle arm 60 is expandable in size and is removably and movably attached by bolt 66 to a forked unit consisting of left split tongue 62 and right split tongue 64. The ends of thee two split tongue units are permanently attached at angles to short, larger diameter tubes called split tongue slide connectors 68. Split tongue slide connectors 68 are designed to slide over and rotate freely around front wheel support bar 24. Handle 56 can be removed from the split tongue unit and stored under expanded plastic bed 10, being held in placed with Velcro 80 attachment straps. The split tongue unit can be rotated and positioned underneath expanded material bed 10, and also retained with Velcro 80, as shown in FIG. 6.

Figure 1:
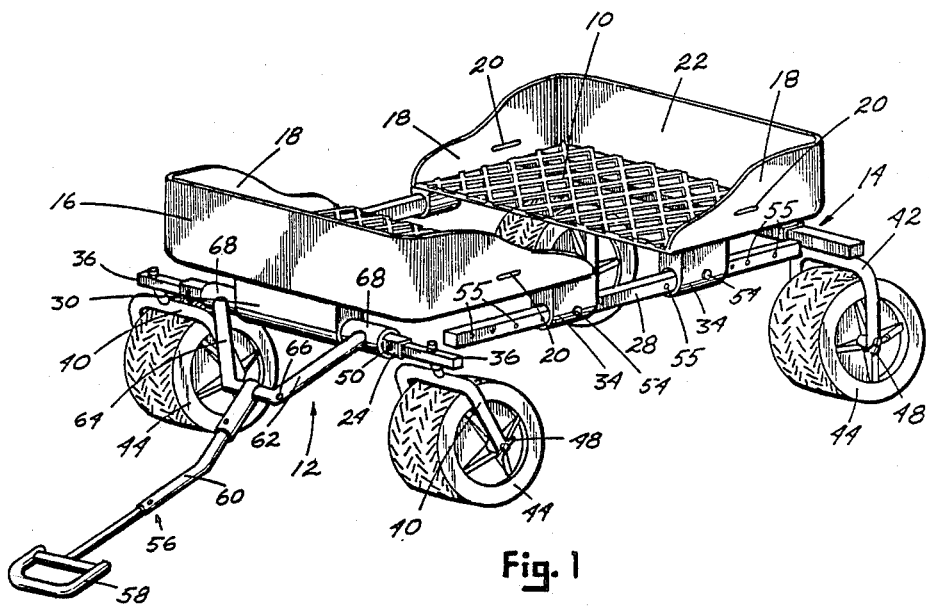
FIG. 1 illustrates the preferred embodiment of the invention in a perspective view.
Figure 2:
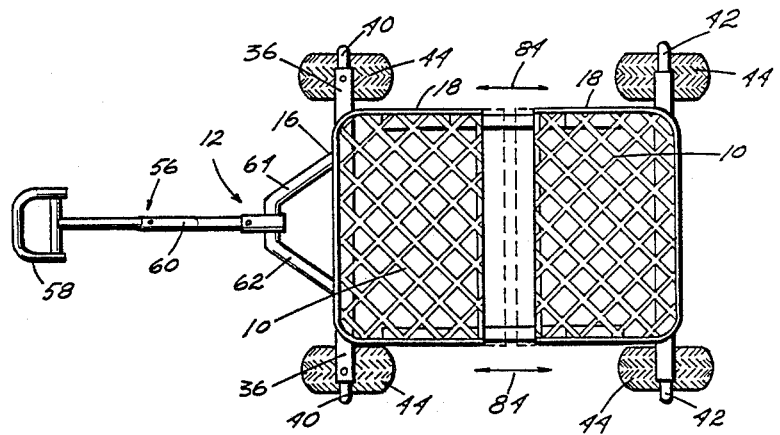
FIG. 2 is a top plan view of the invention.

Attachment means to secure the load being transported within the service cart are provided in the form of two removable straps 70, as seen in the dotted outline of FIG. 4 and 7. Four strap guides 20, seen in FIG. 1 and 4, are located on both side panels 18 to retain straps 70 to the cart, and one lap buckle 72 is provided with each strap to connect the straps and adjust the tension, shown in FIG. 7 securing ice chest 74.

Accessory storage pack 76 is a rectangular fabric pouch containing three pockets and having four attachment straps 78 designed, to carry, along with other items, folding chairs 82 in a widened back pocket and smaller items in two front pockets. Accessory storage pack 76 is provided in pairs as a dual unit and is designed to be connected to itself by attachment straps 78 by means of Velcro 80. Accessory storage pack 76 is best used secured to the load or cargo being transported by the cart, as seen in FIG. 7 being draped over ice chest 74.

In use, as illustrated in FIG. 7, expanded material bed 10 can be quite heavily loaded then the loaded cart can be towed by pulling on hand grip 58. Front wheel swivel bracket 40 allows balloon tire wheel 44 (two of the)) to turn and follow the direction of pull. Balloon tire wheel 44 (all four of them) are designed to traverse sandy areas and rough terrain. For transportation or storage, insert rods 36 and 38 can be pulled out and reinserted with balloon tire wheel 44 (four of them) turned upward reducing the height of the cart assemblage.

Having thus described my invention with considerable details in the foregoing specification, it is to be understood that I may practice modifications in the design and structure so long as any changes made remain within the intended scope of the appended claims.

What I claim is:

1. A four wheeled, low bed service cart with adjustable bed comprising
   a. a bed portion having two substantially rectangular platforms horizontally positioned with broad surfaces upwardly and downwardly and a longer straight edge of one of said platforms aligned with a longer straight edge of the other of said platforms, the opposite outside longer edges of both said platforms rounded cornerwise at emergence with shorter edges, said platforms being separably attached to each other by an adjustable supporting means, said platforms affixed upwardly along said outside longer edges with vertical solid walled low-profile end rails extending in uniform height to said curved merging corners, then curving downwardly along said shorter edges from a higher position to a lower side position forming side rails with said side rails apertured for strap attachment, said two platforms fabricated of expanded material producing minute rectangular openings through said broad surfaces being flooring for said bed portion of said service cart;
   b. a frame portion being said adjustable supporting means for said platforms with said frame portion comprising two horizontally disposed U-shaped rods having a straight rod affixed across the opened end of said U with said U-shaped rods affixed as supportive edging to said downwardly faced broad surfaces of said platforms, said U-shaped rods and said platforms affixed downwardly on each side to a support hanger transversely shafted and slidably encasing an adjustable bed support bar, said bed support bar being a horizontally inclined squared tubing, said bed support bar aligned with adjustment apertures and retained in position in said encasing by a slide adjustment retainer means fitting said apertures in said bed support bar and a single aperture in said support hanger providing adjustment means for increasing and decreasing separation between said separably attached platforms;
   c. a front wheel assemblage aligned crosswise relative to said frame portion and affixed downwardly adjustably to a first extreme end of said bed portion with that particular end being the front end of said cart, said front wheel assemblage attached to said bed portion by a support hanger transversely shafted for centrally encasing a removable front wheel support bar, said front wheel support bar being a hollow rectangular tube sized to accept end insertion of wheel support insert rods, there being means for removably retaining said wheel support insert rods with end fixtures attached oppositely, the inserted end downwardly in a use position or upwardly in a storage position, said end fixtures of said wheel support insert rods having endwardly mounted removable swivel brackets housing balloon tire wheels attached by axles therein, said brackets and wheels positioned individually swiveling one at each end of said front wheel assemblage, there being removably attached hingedly to said front wheel support bar a frontwardly extending telescoping tow handle arm affixed with a rounded and cross membered handle grip at the free end thereof;
   d. a rear wheel assemblage aligned crosswise relative to said frame portion and affixed downwardly adjustably to a second extreme end of said bed portion with that particular end being the rear end of said cart, said rear wheel assemblage attached to said bed portion at said rear end of said cart by a support hanger transversely shafted to house a removable rear wheel support bar, said rear wheel support bar being a hollow rectangular tube sized to accept end insertion of wheel support insert rods, there being means for removably retaining said wheel support insert rods with end fixtures attached oppositely, the inserted end downwardly in a use position or upwardly in a storage position, said end fixtures on said wheel support insert rods having endwardly mounted removable brackets housing balloon tire wheels attached by axles therein, said brackets and wheels positioned one at each end of said rear wheel assemblage;

e. a load securing means comprising two elongated straps removably fastened to said cart attached through said side rail apertures with said straps having adjustable attachment means for temporarily fixing free ends thereof one to the other;

f. an accessory storage means in the form of a rectangular fabric pouch compartmented to house folded beach chairs and lesser items and having straps sized for retaining the maximum cargo applicable to said cart, there being means for adjustably attaching the free ends of said straps one to the other.

2. The service cart of claim 1 wherein said slide adjustment retainer means is a removable pin sized for cooperative insertion through said aperture in said support hanger under said platform edging and through said apertures in said horizontally inclined bed support bar.

3. The service cart of claim 1 wherein said means for removably retaining said wheel support insert rods with end fixtures downwardly in a use position or upwardly in a storage position are Valco snap buttons in aligned apertures.

4. The service cart of claim 1 wherein said platforms, said framing, said wheel housing brackets, and said wheels are manufactured of durable plastic.

5. The service cart of claim 1 wherein said platforms, said framing, said wheel housing brackets, and said wheels are manufactured of metal.

6. The service cart of claim 1 wherein said balloon tires are manufactured of synthetic rubber.

7. The service cart of claim 1 wherein said balloon tires and said wheels are manufactured of plastic derivatives.

8. The service cart of claim 1 wherein said adjustable attachment means for temporarily fixing free ends of said straps are Velcro attachment fittings.

* * * * *